United States Patent
Baric et al.

(10) Patent No.: US 10,543,985 B2
(45) Date of Patent: Jan. 28, 2020

(54) INTERLOCKING WEAR-RESISTANT PANEL SYSTEM

(71) Applicant: FLSmidth A/S, Valby (DK)

(72) Inventors: Zdenko Baric, East Fremantle (AU); Rodney James Stead, Subiaco (AU)

(73) Assignee: FLSMIDTH A/S, Valby (DK)

( * ) Notice: Subject to any disclaimer, the term of this patent is extended or adjusted under 35 U.S.C. 154(b) by 133 days.

(21) Appl. No.: 15/537,922

(22) PCT Filed: Jan. 14, 2016

(86) PCT No.: PCT/IB2016/050177
§ 371 (c)(1),
(2) Date: Jun. 20, 2017

(87) PCT Pub. No.: WO2016/116837
PCT Pub. Date: Jul. 28, 2016

(65) Prior Publication Data
US 2017/0355526 A1    Dec. 14, 2017

(30) Foreign Application Priority Data

Jan. 19, 2015 (DK) .................................. 2015 70025

(51) Int. Cl.
*B32B 3/12* (2006.01)
*B32B 3/24* (2006.01)
(Continued)

(52) U.S. Cl.
CPC .............. *B65G 11/16* (2013.01); *B02C 17/22* (2013.01); *B32B 3/12* (2013.01); *B32B 3/266* (2013.01);
(Continued)

(58) Field of Classification Search
None
See application file for complete search history.

(56) References Cited

U.S. PATENT DOCUMENTS 2,155,215 A * 4/1939 Beament ................ B22D 19/00
                                                          148/522
2,193,956 A * 3/1940 Abrams ................ B02C 17/225
                                                          241/183
(Continued)

FOREIGN PATENT DOCUMENTS

CN    1068599 A  *  2/1993
CN    1109106 A  *  9/1995
(Continued)

OTHER PUBLICATIONS

Machine Translation of JP 64-042232 A, Feb. 1989 (Year: 1989).*
(Continued)

*Primary Examiner* — Jeffrey A Vonch
(74) *Attorney, Agent, or Firm* — Jeffrey A. Sharp (57) ABSTRACT

A wear panel for mining and materials handling applications is provided. The wear panel includes a housing matrix (1) with a top surface (2), a bottom surface (3) opposite the top surface (2) and at least one cavity (4) with cavity walls (5). The cavity (4) extends through the top surface (2) and the bottom surface (3). The wear panel also includes at least one wear-resistant member (6) with a preformed shape. The at least one wear-resistant member (6) has a top surface (7) and a bottom surface (8) opposite the top surface (7). The wear-resistant members (6) are disposed in the cavity (4) and are locked into place by their preformed shape and the cavity walls (5).

4 Claims, 10 Drawing Sheets

(51) Int. Cl.

| | | |
|---|---|---|
| *B32B 3/30* | (2006.01) | |
| *B32B 7/08* | (2019.01) | |
| *B32B 15/04* | (2006.01) | |
| *B32B 15/10* | (2006.01) | |
| *B02C 17/22* | (2006.01) | |
| *B65D 90/04* | (2006.01) | |
| *B65G 11/16* | (2006.01) | |
| *B32B 15/18* | (2006.01) | |
| *B32B 3/26* | (2006.01) | |
| *B32B 3/00* | (2006.01) | |
| *B60R 13/01* | (2006.01) | |
| *B02C 13/282* | (2006.01) | |
| *B02C 13/286* | (2006.01) | |
| *B32B 7/05* | (2019.01) | |

(52) U.S. Cl.
CPC ............... *B32B 3/30* (2013.01); *B32B 7/08* (2013.01); *B32B 15/18* (2013.01); *B65D 90/041* (2013.01); *B65D 90/042* (2013.01); *B65D 90/043* (2013.01); *B02C 13/282* (2013.01); *B02C 2013/2825* (2013.01); *B02C 2013/28681* (2013.01); *B02C 2210/02* (2013.01); *B32B 3/00* (2013.01); *B32B 3/26* (2013.01); *B32B 7/05* (2019.01); *B32B 15/04* (2013.01); *B32B 2307/54* (2013.01); *B32B 2307/554* (2013.01); *B32B 2307/732* (2013.01); *B32B 2311/30* (2013.01); *B32B 2315/02* (2013.01); *B32B 2607/00* (2013.01); *B60R 13/01* (2013.01); *B65G 11/166* (2013.01); *B65G 2207/48* (2013.01); *Y10S 428/9088* (2013.01); *Y10T 428/12361* (2015.01); *Y10T 428/16* (2015.01); *Y10T 428/161* (2015.01); *Y10T 428/22* (2015.01); *Y10T 428/24157* (2015.01); *Y10T 428/24182* (2015.01); *Y10T 428/24298* (2015.01); *Y10T 428/24322* (2015.01); *Y10T 428/24339* (2015.01)

(56) References Cited

U.S. PATENT DOCUMENTS

| | | | | | |
|---|---|---|---|---|---|
| 3,607,607 | A | * | 9/1971 | Beninga | C04B 41/009 428/49 |
| 3,734,699 | A | * | 5/1973 | Austermann | B65D 90/043 428/583 |
| 3,893,634 | A | * | 7/1975 | Schmidt | B02C 13/282 241/182 |
| 4,547,985 | A | * | 10/1985 | Silins | B23K 35/0288 172/701.1 |
| 4,639,388 | A | * | 1/1987 | Ainsworth | B32B 15/04 428/117 |
| 5,055,336 | A | * | 10/1991 | Davis | B65G 11/166 193/2 R |
| 5,267,600 | A | * | 12/1993 | Revankar | B22D 19/08 164/111 |
| 5,299,620 | A | * | 4/1994 | Revankar | B22D 19/08 164/111 |
| 5,328,776 | A | * | 7/1994 | Garber | B02C 1/10 241/291 |
| 5,954,282 | A | * | 9/1999 | Britzke | B02C 13/1814 241/275 |
| 6,129,967 | A | * | 10/2000 | Young | B32B 3/16 428/49 |
| 2001/0032541 | A1 | * | 10/2001 | Benyami | F41H 5/023 89/36.02 |
| 2002/0195223 | A1 | * | 12/2002 | Herbst | B02C 7/12 164/98 |
| 2003/0025020 | A1 | * | 2/2003 | Britzke | B02C 13/1814 241/275 |
| 2004/0083880 | A1 | * | 5/2004 | Cohen | F41H 5/0414 89/36.02 |
| 2004/0226251 | A1 | * | 11/2004 | Hyde | E04C 5/04 52/674 |
| 2004/0229001 | A1 | * | 11/2004 | Hyde | B32B 3/12 428/44 |
| 2007/0258791 | A1 | * | 11/2007 | Davies | B60R 13/01 411/397 |
| 2008/0135659 | A1 | * | 6/2008 | Condon | B02C 13/1814 241/274 |
| 2008/0265074 | A1 | * | 10/2008 | Melo | B02C 17/22 241/299 |
| 2008/0317992 | A1 | * | 12/2008 | Malmberg | B02C 17/225 428/44 |
| 2009/0044898 | A1 | * | 2/2009 | Hellman | B23K 1/0008 156/196 |
| 2009/0047543 | A1 | * | 2/2009 | Garber | B02C 1/10 428/687 |
| 2009/0166456 | A1 | * | 7/2009 | Hellman | B29C 39/006 241/179 |
| 2009/0173595 | A1 | * | 7/2009 | Burstrom | B65G 11/166 193/25 E |
| 2010/0006189 | A1 | * | 1/2010 | Larker | C21D 5/00 148/548 |
| 2010/0025512 | A1 | * | 2/2010 | Liimatainen | B02C 13/2804 241/300 |
| 2010/0143742 | A1 | * | 6/2010 | Tsypine | B22D 19/00 428/600 |
| 2010/0155042 | A1 | * | 6/2010 | Karlsson | C22C 37/00 165/185 |
| 2011/0011965 | A1 | * | 1/2011 | Mirchandani | B22F 7/062 241/277 |
| 2011/0290616 | A1 | * | 12/2011 | Tenold | B65G 11/166 193/2 R |
| 2012/0088055 | A1 | * | 4/2012 | Davies | B65G 11/166 428/44 |
| 2013/0026274 | A1 | * | 1/2013 | Mirchandani | B22F 7/062 241/277 |
| 2013/0099031 | A1 | * | 4/2013 | Sato | B02C 4/08 241/27 |
| 2013/0247349 | A1 | * | 9/2013 | Li | B02C 17/22 29/402.09 |
| 2015/0224509 | A1 | * | 8/2015 | Serrano | B02C 11/00 241/299 |
| 2015/0231700 | A1 | * | 8/2015 | Karakkunnummal | B02C 4/305 241/293 |
| 2016/0303574 | A1 | * | 10/2016 | Chen | B02C 17/22 |
| 2017/0173590 | A1 | * | 6/2017 | Kjaerran | B02C 13/1835 |

FOREIGN PATENT DOCUMENTS

| | | | | |
|---|---|---|---|---|
| CN | 1109384 | A | * | 10/1995 |
| CN | 2237484 | Y | * | 10/1996 |
| CN | 1651146 | A | * | 8/2005 |
| CN | 101024556 | A | * | 8/2007 |
| CN | 201006406 | Y | * | 1/2008 |
| CN | 101566271 | A | * | 10/2009 |
| CN | 201346896 | Y | * | 11/2009 |
| CN | 101598261 | A | * | 12/2009 |
| CN | 201368320 | Y | * | 12/2009 |
| CN | 201496755 | U | * | 6/2010 |
| CN | 101806388 | A | * | 8/2010 |
| CN | 101811076 | A | * | 8/2010 |
| CN | 101816905 | A | * | 9/2010 |
| CN | 201721076 | U | * | 1/2011 |
| CN | 102139362 | A | * | 8/2011 |
| CN | 201913843 | U | * | 8/2011 |
| CN | 102211196 | A | * | 10/2011 |
| CN | 202017872 | U | * | 10/2011 |
| CN | 202017874 | U | * | 10/2011 |
| CN | 202100925 | U | * | 1/2012 |
| CN | 202115918 | U | * | 1/2012 |
| CN | 202115918 | U | * | 1/2012 |
| CN | 202130034 | U | * | 2/2012 |
| CN | 102581259 | A | * | 7/2012 |
| CN | 202371429 | U | * | 8/2012 |
| CN | 202493888 | U | * | 10/2012 |

(56) References Cited

FOREIGN PATENT DOCUMENTS

| | | | | |
|---|---|---|---|---|
| CN | 103060668 A | * | 4/2013 | |
| CN | 203857254 U | * | 10/2014 | |
| CN | 104139172 A | * | 11/2014 | |
| DE | 10047095 A1 | * | 4/2002 | ............ B02C 13/282 |
| DE | 102010016286 A1 | * | 10/2011 | ............ B02C 17/22 |
| EP | 0241723 B1 | * | 6/1991 | ........ B01F 15/00837 |
| EP | 2674221 A1 | | 12/2013 | |
| EP | 2674221 A1 | * | 12/2013 | ............ B02C 17/225 |
| GB | 1445255 A | * | 8/1976 | ............ B65G 11/166 |
| GB | 2107288 A | * | 4/1983 | ............ B65G 11/166 |
| JP | 60040661 A | * | 3/1985 | ............ B22D 19/00 |
| JP | 63168268 A | * | 7/1988 | |
| JP | 64042232 A | * | 2/1989 | |
| JP | 02018046 A | * | 1/1990 | |
| JP | 2000130412 A | * | 5/2000 | |
| JP | 2000246125 A | * | 9/2000 | |
| JP | 2010058155 A | * | 3/2010 | |
| RU | 2170142 C2 | * | 7/2001 | |
| WO | WO-8303895 A1 | * | 11/1983 | ............ F41H 5/023 |
| WO | WO-9811991 A1 | * | 3/1998 | ......... B02C 17/1855 |
| WO | 2006132582 A1 | | 12/2006 | |
| WO | 2011012629 A1 | | 2/2011 | |
| WO | WO-2015017894 A1 | * | 2/2015 | ............... E02F 3/40 |

OTHER PUBLICATIONS

Machine Translation of RU 2170142 C2, Jul. 2001 (Year: 2001).*
Machine Translation of JP 2000246125 A, Sep. 2000 (Year: 2000).*
Machine Translation of JP 2010058155 A, Mar. 2010 (Year: 2010).*
Machine Translation of EP 241723 B1, Jun. 1991 (Year: 1991).*
Machine Translation of CN 1068599 A, Feb. 1993 (Year: 1993).*
Machine Translation of CN 101024556 A, Aug. 2007 (Year: 2007).*
Machine Translation of CN 201346896 Y, Nov. 2009 (Year: 2009).*
Machine Translation of CN 201368320 Y, Dec. 2009 (Year: 2009).*
Machine Translation of CN 2237484 Y, Oct. 1996 (Year: 1996).*
Machine Translation of CN 202100925 U, Jan. 2012 (Year: 2012).*
AZO Materials, AISI 4140 Chrome-Molybdenum High Tensile Steel, Jul. 2012, <https://www.azom.com/article.aspx?ArticleID=6116> (Year: 2012).*
Ductile Iron Society, Iron Data for Design Engineers, May 2011 (Year: 2011).*
International Search Report and Written Opinion dated Feb. 19, 2016, 11 pages.

* cited by examiner

INTERLOCKING WEAR-RESISTANT PANEL SYSTEM

FIELD OF THE INVENTION

The present invention relates to a wear-resistant panel suitable for use as a liner in or pad below, e.g. chutes, hoppers, bins and other materials handling equipment where abrasive or corrosive material would cause rapid wear. In particular, the present invention relates, but is not limited to, an improved wear-resistant panel containing a wear-resistant housing matrix and at least one wear-resistant member disposed in a cavity of the housing matrix and locked into place by the preformed shape of the wear-resistant member and walls of the cavity.

BACKGROUND TO THE INVENTION

Reference to background art herein is not to be construed as an admission that such art constitutes common general knowledge in Australia or elsewhere.

Wear panels are typically used in the minerals, mining, foundry, milling and materials handling industries in order to increase the life of equipment, decrease maintenance downtime and increase throughput. Such panels are typically secured to the floor and walls of chutes, hoppers, bins, tanks, separator devices, fan housings and other equipment where abrasive or corrosive material would cause rapid wear in order to provide an area of cover or liner in sliding contact with materials such as crushed rock, coal, ore, grain and other abrasive aggregates.

There are an existing range of wear panels, for example those disclosed in e.g. U.S. Pat. Nos. 4,307,140; 5,055,336; 5,705,250; 6,129,967 and 8,039,075. However, such panels have drawbacks in that they are e.g. expensive to manufacture, require specialized tooling to fabricate and assemble, require the use of screws, anchors, adhesives or rubber substrates to bond portions of the wear panels together, are difficult to cut and assemble on site, require long-lead times and typically experience de-lamination and cracking. By way of example, ceramic wear members have been used in wear panels. However, when ceramic edges are exposed to wear, the edges easily chip. In addition, when the ceramic wear members are encapsulated in polyurethane or rubber, delamination can occur; when using e.g. a hot moulding rubber process, thermal shock can damage the ceramic or other wear members and create a less preferable product; and a hot casting off-site facility is typically required for manufacture and assembly which can increase cost and lead-times. Bonding ceramic to other wear materials can be complicated and unreliable. Further, the use of screws and anchors in order to attach wear members can create weaknesses in the members causing cracking, are more expensive to manufacture, require tooling and are difficult to assemble on site. Additionally, when wear panels are assembled off site and delivered to a customer site in whole, if dimensional or figuration changes must be made, such wear panels are difficult to cut and burdensome to manoeuver.

OBJECT OF THE INVENTION

It is an aim of this invention to provide an improved wear panel which overcomes or ameliorates one or more of the disadvantages or problems described above, or which at least provides a useful alternative.

Other preferred objects of the present invention will become apparent from the following description.

SUMMARY OF INVENTION

According to a first aspect of the invention, there is provided a wear panel comprising a housing matrix having a top surface, a bottom surface opposite the top surface and at least one cavity having cavity walls, the cavity extending through the top surface and the bottom surface; at least one wear-resistant member having a preformed shape and having a top surface, a bottom surface opposite the top surface; the wear-resistant member is disposed in the cavity and is locked into place by its preformed shape and the cavity walls.

In vertical cross-section the cavity walls may have a decreasing width throughout their depth. And, in vertical cross-section the wear-resistant members may have an increasing width throughout their depth.

The wear panel can be further comprised of a backing plate disposed on the bottom surface of the housing matrix. The wear panel can also be further comprised of an energy-absorbing layer disposed between the backing plate and the bottom surface of the housing matrix.

At least one of the wear-resistant members can be comprised of a ceramic. The housing matrix can be comprised of an iron. The backing plate can be comprised of a metal. The backing plate can also be comprised of polyurethane, a wood or a rubber. The energy-absorbing layer can be comprised of a rubber.

At least a portion of the top surface of the wear-resistant member can protrude from the top surface of the housing matrix.

The wear-resistant members can be comprised of different materials and can be varying shapes and sizes. For example, a wear-resistant member can be e.g. in horizontal cross-section substantially rectangular. A wear-resistant member could also be e.g. in horizontal cross-section a quadrilateral or hexagonal.

The wear panel can further be comprised of a bore, the bore extending through the cavity walls. The wear panel can be attached to equipment with at least one attaching means disposed in the bore.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

FIGS. 1-15 illustrate embodiments of a wear panel of the present invention.

FIGS. 1-4 show a wear panel having a housing matrix 1. In some embodiments, the housing matrix 1 is comprised of a metal, for example: SG iron (e.g. an iron with a tensile strength greater than 200 MPa), cast iron, steel alloys (e.g. 400-500 Brinell), hi-chrome steel, manganese. In other embodiments, the housing matrix 1 is comprised of polyurethane or rubber. The housing matrix can be comprised of one material or a mix of materials. The housing matrix 1 has a top surface 2 and a bottom surface 3. The bottom surface 3 is opposite the top surface 2. The housing matrix 1 also has one or more cavities 4 which are defined by cavity walls 5. The cavity walls 5 define each side of the at least one cavity 4. The cavities 4 extend through the top surface 2 and the bottom surface 3. In some embodiments, the cavities 4 and cavity walls 5 are tapered. For example, in vertical cross-section the cavities 4 and cavity walls 5 can increase or decrease in width throughout their depth. In horizontal cross-section the cavities can be substantially rectangular. In other embodiments, in horizontal cross-section the cavities 4 and cavity walls 5 can be other shapes, for example, a circle, a triangle, a quadrilateral, a pentagon, a hexagon, an irregular hexagon, a polygon. In such embodiments, the cavity walls 5 which define each side of the at least one cavity 4 will substantially conform to the shape of the cavity 4.

Figure 4:
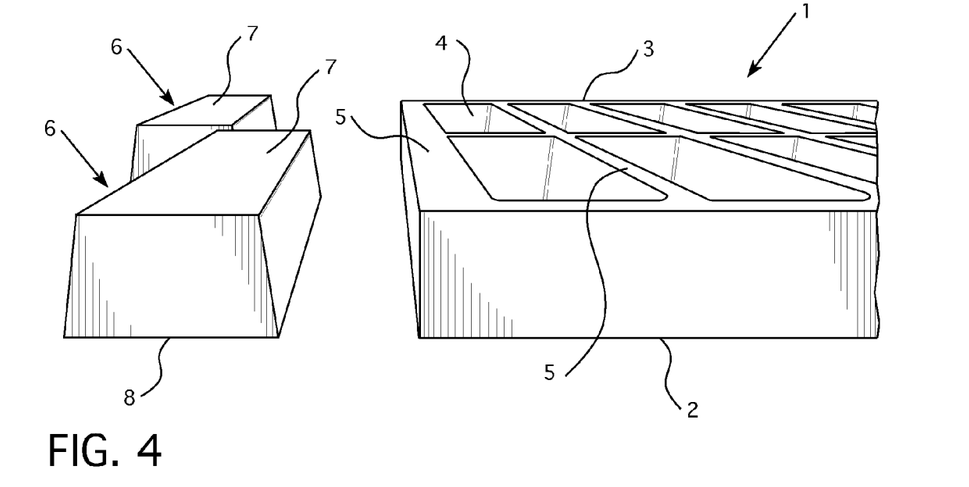
FIG. 4 is a close-up side view of the wear panel illustrated in FIG. 1.
Figure 6:
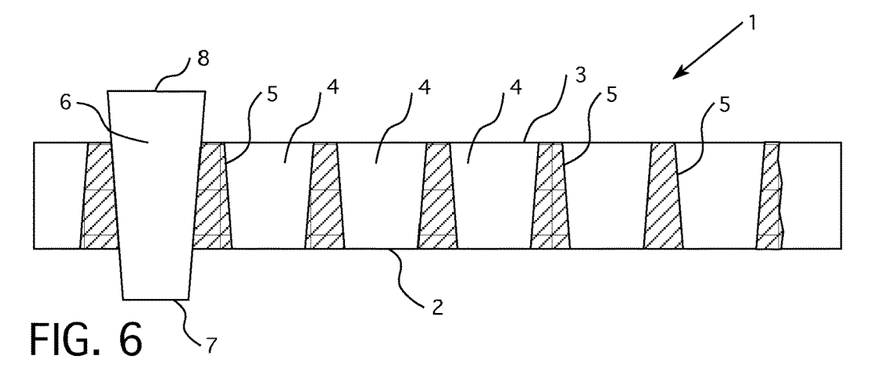
FIG. 6 is a side cross-sectional view of a wear panel according to an embodiment of the invention.

As clearly shown in e.g. FIGS. 4 and 6, in vertical cross section the cavity walls 5 decrease in width throughout their depth. However, in other embodiments the width of the cavity walls 5 can be reversed and in vertical cross-section the cavity walls 5 can increase in width throughout their depth. In yet other embodiments, in vertical cross-section the cavity walls 5 can be varying widths throughout their depth. In some embodiments, each of the cavities 4 and cavity walls 5 are substantially the same (e.g.—horizontal cross-sectional shapes and sizes and in vertical cross-sectional widths). In other embodiments, some or all of the cavities 4 and cavity walls 5 are different (e.g.—horizontal cross-sectional shapes and sizes and in vertical cross-sectional widths).

Figure 7:
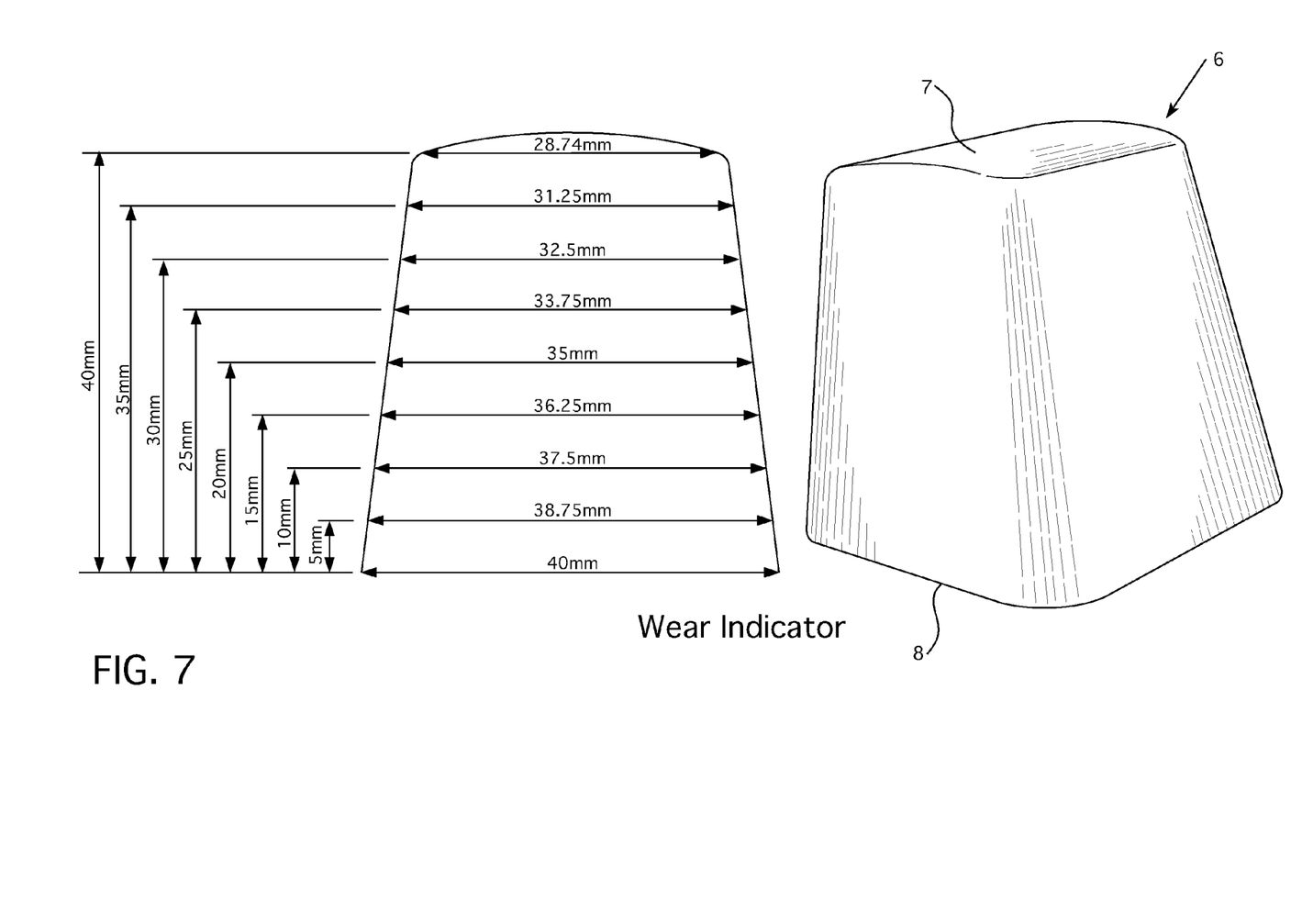
FIG. 7 is a close up view of a wear-resistant member according to an embodiment of the invention showing how wear can be measured.
Figure 8:
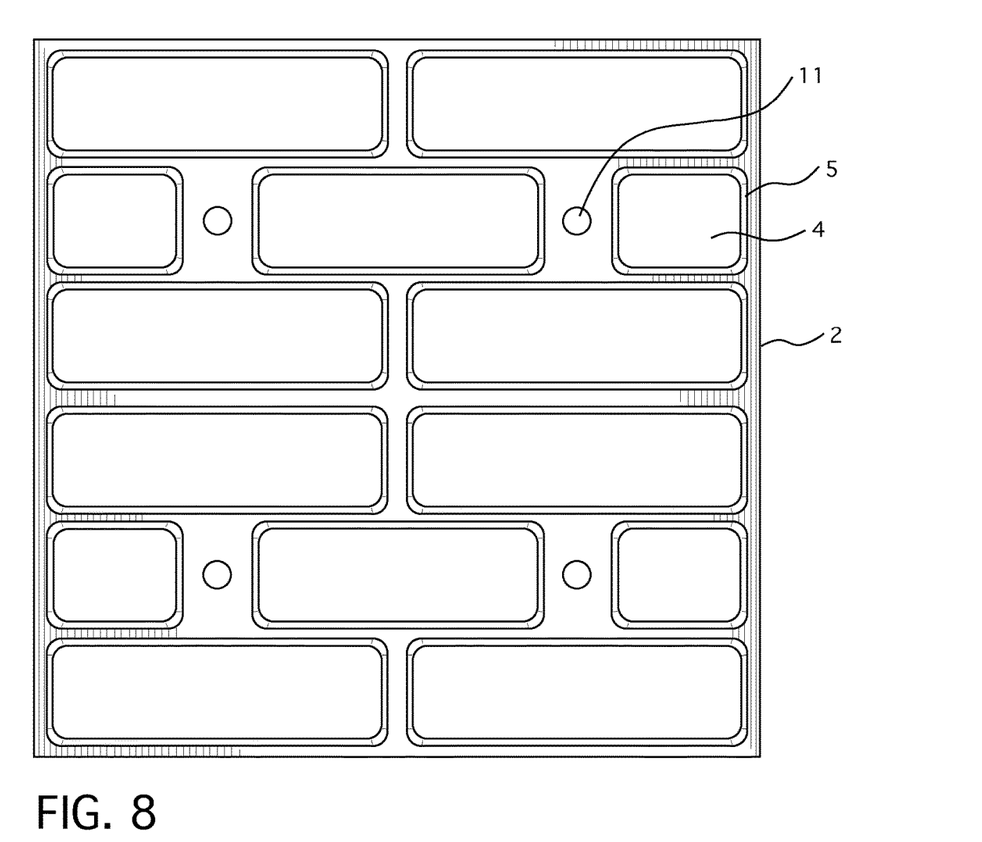
FIG. 8 is a top view of a wear panel according to another embodiment of the invention.
Figure 9:
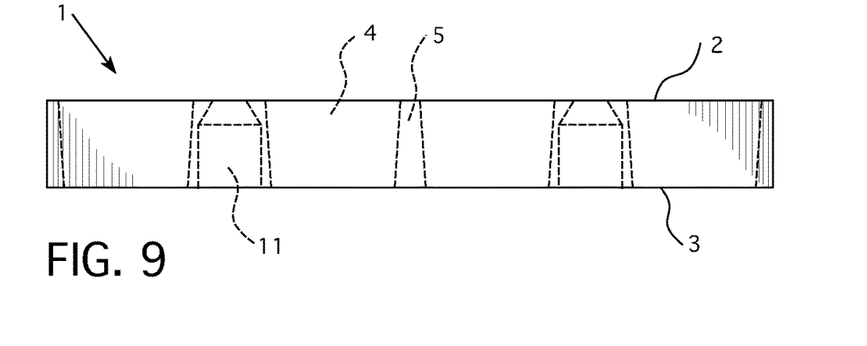
FIG. 9 is a side cross-sectional view of a wear panel according to the embodiment of the invention illustrated in FIG. 8.
Figure 10:
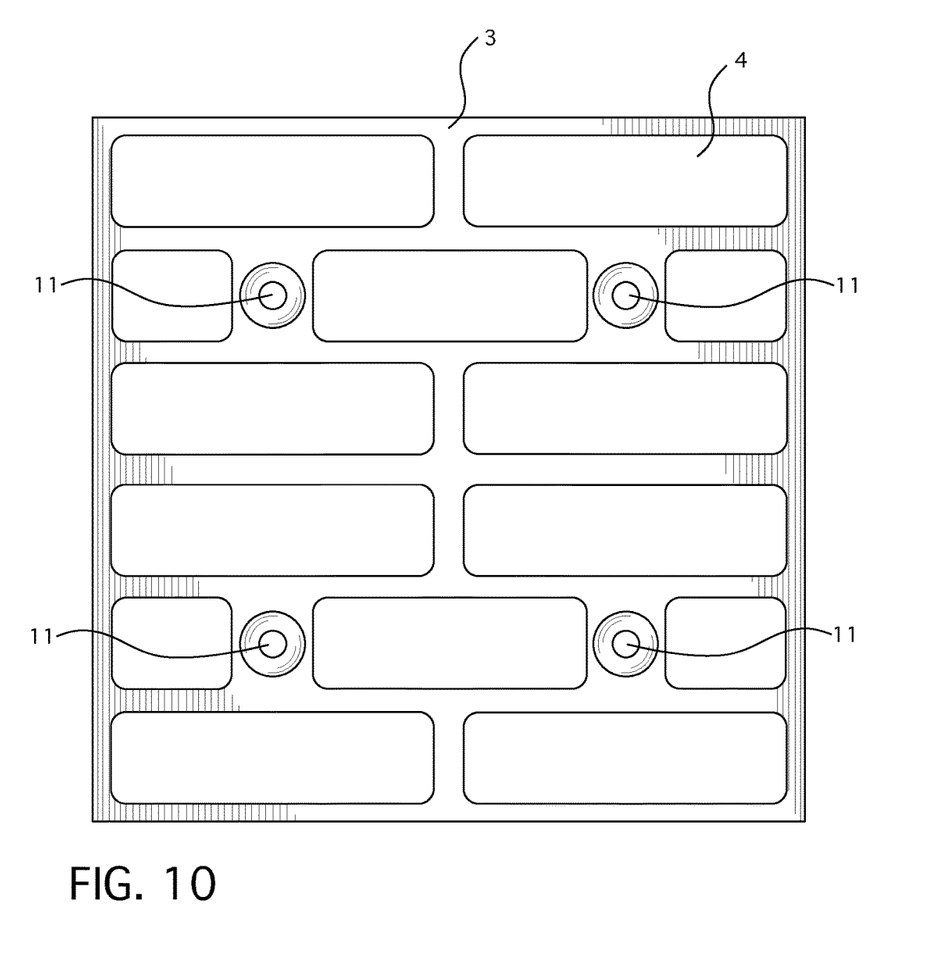
FIG. 10 is a bottom view of the wear panel illustrated in FIG. 8.
Figure 11:
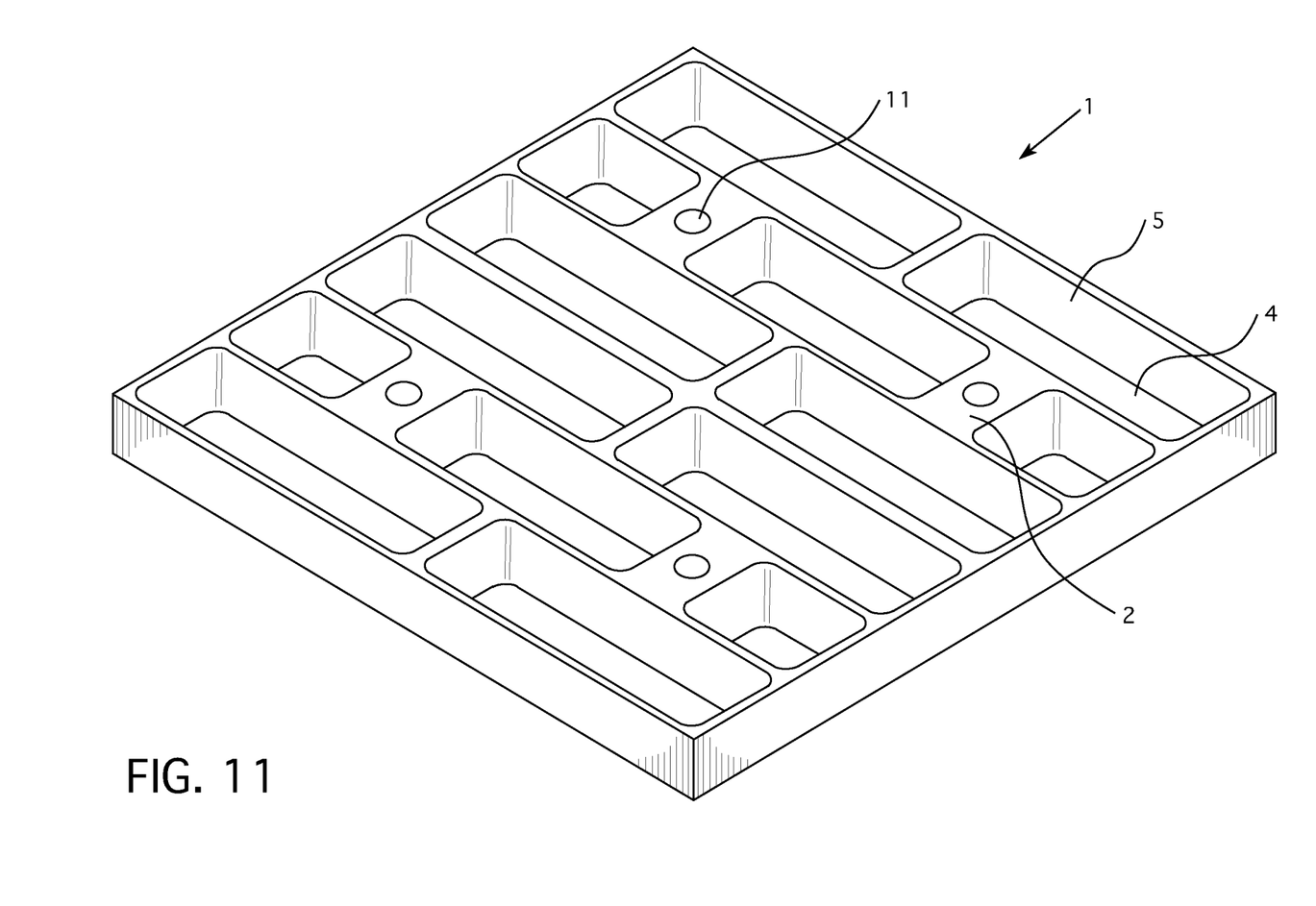
FIG. 11 is a perspective view of the wear panel illustrated in FIG. 8.
Figure 12:
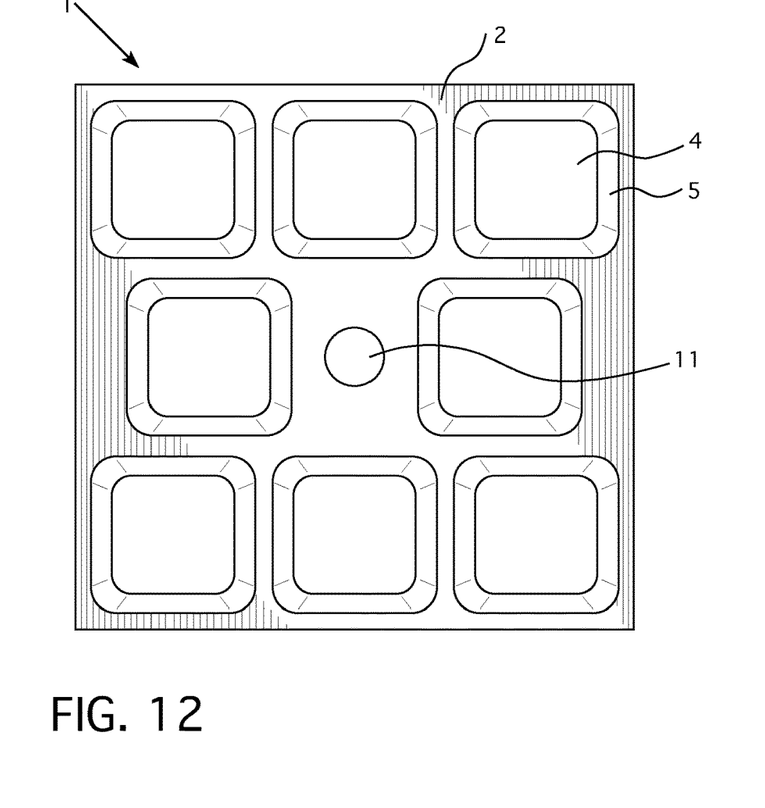
FIG. 12 is a top view of a wear panel according to another embodiment of the invention.
Figure 13:
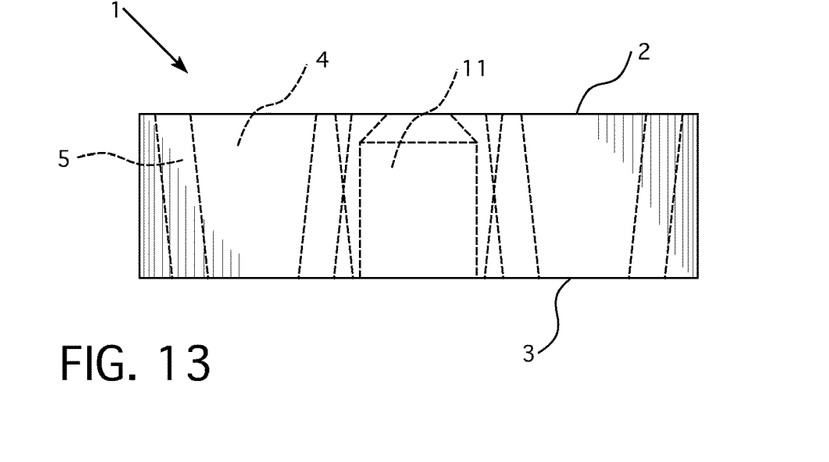
FIG. 13 is a side cross-sectional view of a wear panel according to the embodiment of the invention illustrated in FIG. 12.
Figure 14:
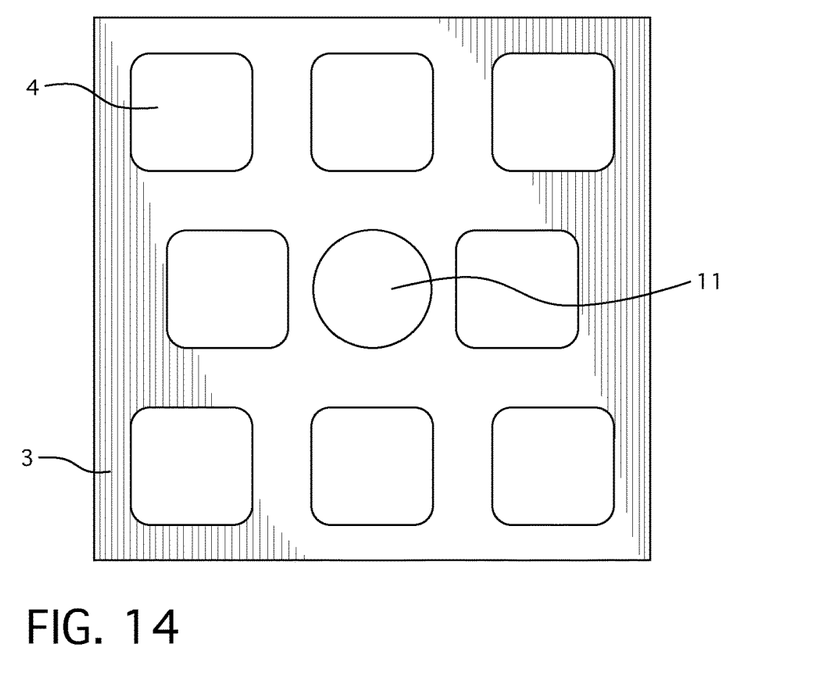
FIG. 14 is a bottom view of the wear panel illustrated in FIG. 12.
Figure 15:
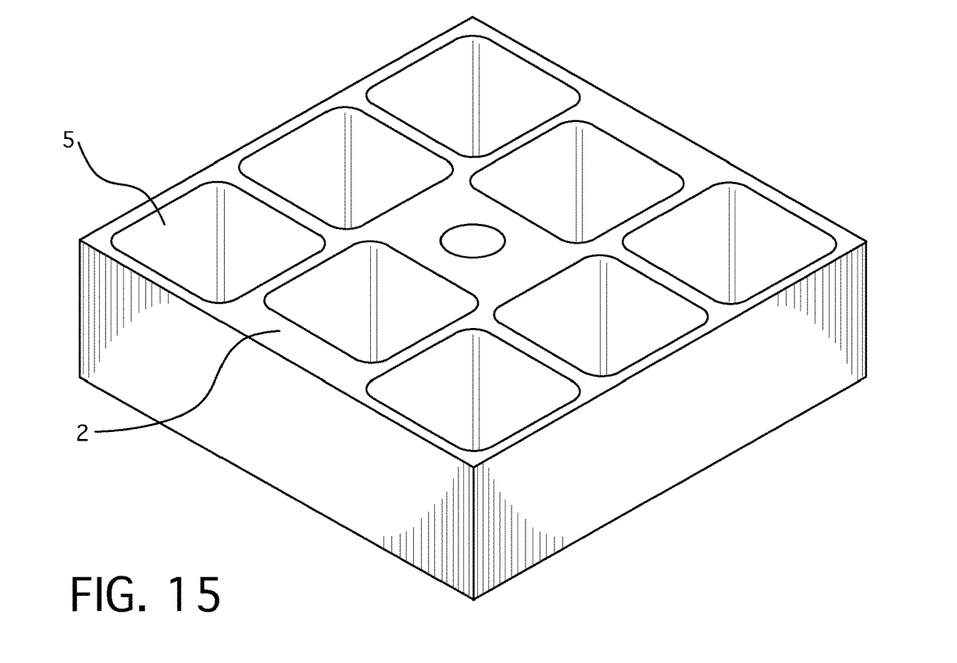
FIG. 15 is a perspective view of the wear panel illustrated in FIG. 12.

Also shown in FIGS. 1-4 is a wear panel 1 having at least one wear-resistant member 6. In some embodiments, the wear-resistant members 6 are comprised of ceramics e.g. alumina (e.g. 92% $Al_2O_3$ high density alumina), zirconia, silicon carbide, silicon nitride, boron carbide, tungsten carbide. In other embodiments, the wear-resistant members 6 are comprised of materials other than ceramics such as e.g. urethane, rubber or other hard materials well known in the art. The wear-resistant members 6 can be pure materials or composites. Individual wear-resistant members 6 can be comprised of different pure or composite materials or individual wear-resistant member 6 can be comprised of the same materials. The wear-resistant members 6 have a preformed shape, a top surface 7 and a bottom surface 8 which is opposite the top surface 7. In some embodiments, the wear-resistant members 6 are tapered. For example, in vertical cross-section the wear-resistant members 6 can increase or decrease in width throughout their depth. As shown in FIG. 7, in addition to the advantages demonstrated below, the tapered shape advantageously provides an accurate wear indicator across the wear plate in that wear can be measured/calculated by measuring the cross-sectional area of the surface of the wear member 6. In some embodiments the wear-resistant members 6 in horizontal cross-section are substantially rect-angular. In other embodiments, in horizontal cross-section the wear-resistant members 6 are other shapes, for example, a circle, a triangle, a quadrilateral, a polygon, a pentagon, a hexagon, an irregular hexagon. In such embodiments, the preformed shape of the wear-resistant member 6 will substantially conform to the shape of the cavity 4 and the cavity walls 5. In some embodiments, each of the wear-resistant members 6 is substantially the same (e.g.—shape, size and material). In other embodiments, some or all of the wear-resistant members 6 are different (e.g.—shape, size and material). In yet other embodiments the wear-resistant members 6 can have varying widths throughout their depth.

Figure 1:
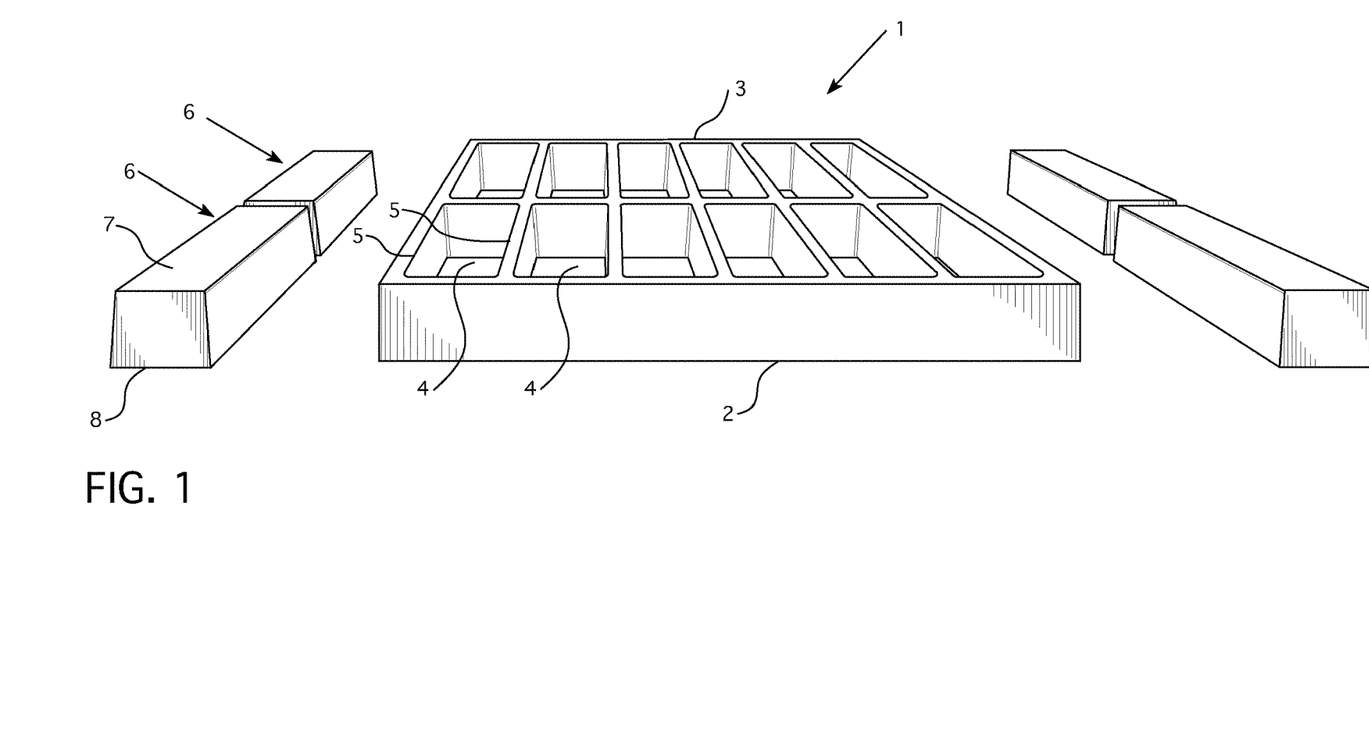
FIG. 1 is a perspective view of a wear panel according to an embodiment of the invention.
Figure 2:
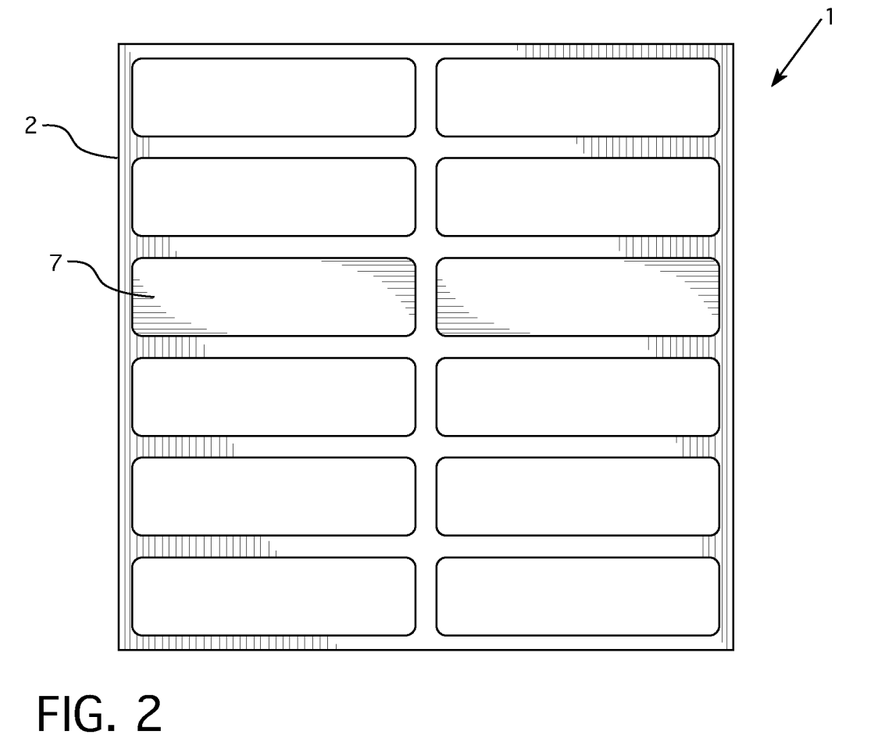
FIG. 2 is a top view of the wear panel illustrated in FIG. 1.
Figure 3:
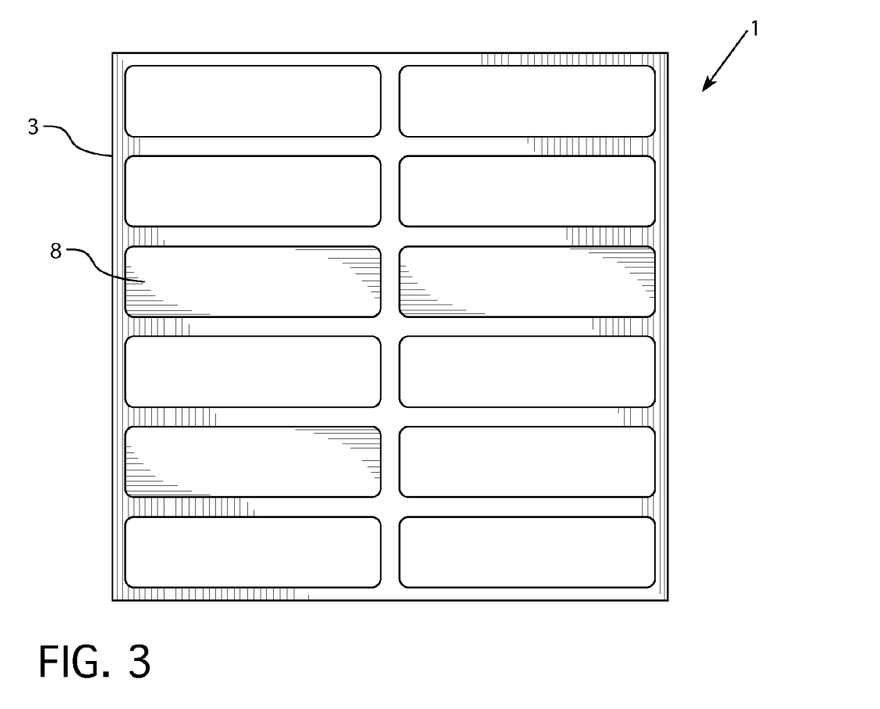
FIG. 3 is a bottom view of the wear panel illustrated in FIG. 1.

As shown in FIGS. 2, 3 and 6, the wear-resistant members 6 can be disposed in the cavities 4 and can be locked into place by the preformed shape and the cavity walls 5 ("interlocking"). The interlocking is advantageous. For example, by placing the wear-resistant members 6 in the cavity 4, the edges of the wear-resistant members 6 are not exposed to wear and are further protected to reduce and eliminate chipping. Moreover, the interlocking eliminates the need to encapsulate the wear-resistant members 6 in e.g. polyurethane or rubber, so the risk of delamination is eliminated. By way of further example, the interlocking eliminates the need for hot moulding, hot casting and the problems associated therewith or the need for an off-site manufacturing facility which allows for on-site assembly. The wear panels can easily be cut on site with a specialized blade or plasma. The interlocking further eliminates the need for the use of screws or anchors and allows for dimensional changes to be made on site. In some embodiments, in addition to the interlocking, the wear-resistant members 6 can be welded into the cavities 4 onto the cavity walls 5.

Figure 5:
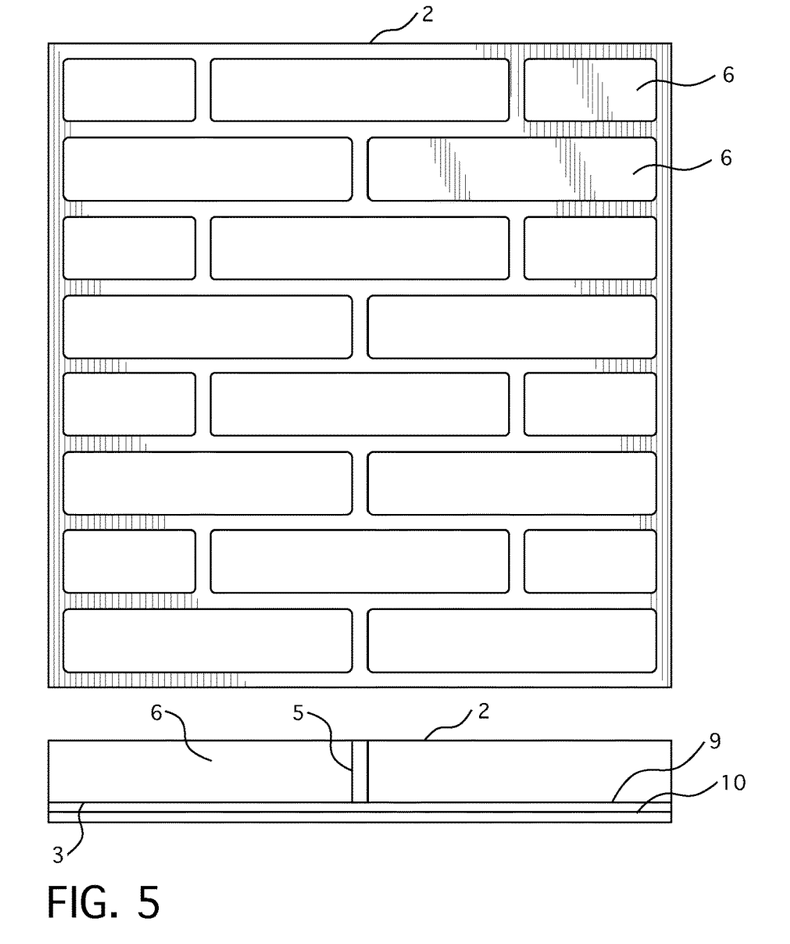
FIG. 5 is a close up top and side perspective view of a wear panel according to an embodiment of the invention.

FIG. 5 shows an embodiment of the wear panel having an energy-absorbing layer 9 and a backing plate 10. In some embodiments, the wear panel only has a backing plate 10 and not an energy-absorbing layer 9, or vice versa. The backing plate 10 can be used to attach the wear panel to equipment. The wear panels can be attached to equipment described herein or as needed by those of skill in the art directly by the housing matrix 1, fox example by screws, welding, glue, epoxy or other well-known attachment mechanisms. As shown in for example, FIGS. 8-15, the housing matrix 1 can have bores 11 which extend through the top surface 2 and the bottom surface 3 of the cavity walls 5. In some embodiments the cavity walls 5 having a bore 11 therethrough are thicker than cavity walls not having a bore 11 extending therethrough. A screw or other attaching means can be disposed in said bore 11 to attach the wear panel to the equipment described herein or as needed by those of skill in the art. Having the bore 11 in the housing matrix 1 is advantageous in that the wear members 6 maintain their integrity and are not weakened or chipped and that the wear members can wear uniformly without impacting the attachment of the wear panel to equipment.

As shown in FIG. 6, at least a portion of the top surface 7 of the wear-resistant members 6 can protrude from the top surface 2 of the housing matrix 1. Such an arrangement is advantageous in applications where sliding or impact resistance is desired. In other embodiments, as shown for example in FIGS. 8 and 9, the top surface 7 of the wear-resistant members 6 can be flush with the top surface 2 of the housing matrix 1. Such an arrangement is advantageous in applications where impact resistance is desired.

As shown in FIG. 5, in one exemplary embodiment twenty wear-resistant members 6 are provided in a cast iron housing matrix 1. An energy-absorbing layer 9 made of rubber and a backing plate 10 made of steel are provided. The wear panel measures 300 mm×300 mm, the wear-resistant members 6 are 25 mm thick, and the energy-absorbing layer 9 and the backing plate 10 are 6 mm thick. In other embodiments, as shown for example in FIGS. 12-15, the wear panel measures 150 mm×150 mm. In other embodiments, the wear panel is substantially larger than 300 mm×300 mm.

As shown in FIGS. 8-11, in one exemplary embodiment fourteen wear-resistant members 6 are provided in a cast iron housing matrix 1. As shown in e.g. FIGS. 8-11, in some embodiments, the wear resistant members 6 are positioned in the housing matrix 1 such that the wear resistant members are different sizes and as shown the housing matrix is of a larger volume in areas in which there are bores 11.

A field trial of the wear panels described herein was conducted. The parameters used in the test were as follows: a wet ore (lateritic nickel with granite), size typically 120-250 mm, drop height of approximately 1100 mm, tonnes per hour of 600 dtph and an angle of impact of 60 degrees. The wear panels lasted for 46 days which was significantly longer than conventional wear panels (ceramic/rubber wear panel lasting 2 days and a domite 20/10 wear panel lasting 18 days. The maintenance superintendent at the plant in which the field trial was conducted stated that "FLSmidth's new wear liner was tested in one of our high wear areas for comparison against a Domite plate. The difference was noticeable, with the FLSmidth product lasting twice as long as the liner we currently use. FLSmidth's product has another advantage too-in its construction it's lighter than any other liner I've seen, so it's safer to install. This is very important in the enclosed spaces typical of chutes and transfer points.

All in all, it's simple to use, lasts longer than the liners I've used and safer than most other liners to install. It's an impressive product."

The wear panels described herein are provided merely as examples of a wear panel to which the invention of the claims may be applied. The specification does not suggest that the invention of the claims is limited to or applies only to this wear panel.

In this specification, adjectives such as first and second, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

LIST OF REFERENCE IDENTIFIERS

1 housing matrix
2 top surface (housing matrix)
3 bottom surface (housing matrix)
4 cavity
5 cavity wall
6 wear-resistant member
7 top surface (wear-resistant member)
8 bottom surface (wear-resistant member)
9 energy-absorbing layer
10 backing plate
11 bore

What is claimed is:

1. A wear panel configured to be attached to equipment selected from the group consisting of chutes, hoppers, bins, tanks, separator devices, and fan housings, the wear panel comprising:

a housing matrix comprising SG iron and having a top surface, a bottom surface the top surface, and a plurality of cavities, each of the cavities being substantially rectangular with rounded corners in cross-section and having tapered cavity walls, each of the cavities extending through the top surface the bottom surface of the housing matrix, the cavity walls having a dimension throughout their depth, wherein each of the cavities narrow as they approach the top surface of the housing matrix;

a plurality of wear-resistant members, each of the wear-resistant members being substantially rectangular with rounded corners in cross-section and having tapered walls and a preformed tapered shape corresponding to the dimension of the cavity walls, each of the wear-resistant members further comprising a curved, convex top surface, and a wider bottom surface opposite the top surface, the wear-resistant members having varying widths throughout their depth such that they narrow towards their respective top surfaces, the wear-resistant members comprising a ceramic;

the wear-resistant members being disposed in the cavities by insertion into the housing matrix through the bottom surface of the housing matrix and being locked into place by their preformed tapered shape and the cavity walls by moving the wear-resistant members towards the top surface of the housing matrix;

wherein at least a portion of the top surface of each wear-resistant member protrudes from the top surface of the housing matrix, the preformed tapered shape serving as a wear indicator across the wear panel, such that wear can be measured or calculated from the cross-sectional area of the wear-resistant members;

the housing matrix further comprising a bore, wherein the bore is configured to receive at least one attaching means for attaching the wear panel to the equipment such that the bottom surface of the housing matrix faces the equipment and the top surfaces of the wear-resistant members face away from the equipment; and the bore extending through the top surface and bottom surface of the housing matrix and being positioned between the cavities and centrally-disposed with respect to the housing matrix, wherein the bore is narrower adjacent the bottom surface of the housing matrix than adjacent the top surface of the housing matrix.

2. The wear panel of claim 1, wherein said wear panel is attached to the equipment with the at least one attaching means disposed in said bore.

3. The wear panel of claim 1, wherein said at least one attaching means comprises a screw.

4. The wear panel of claim 1, wherein said SG iron comprises a tensile strength greater than 200 MPa.

* * * * *